No Printed Specification Available
9848X
I. Thompson,
Truss.
Patented July 1, 1836.
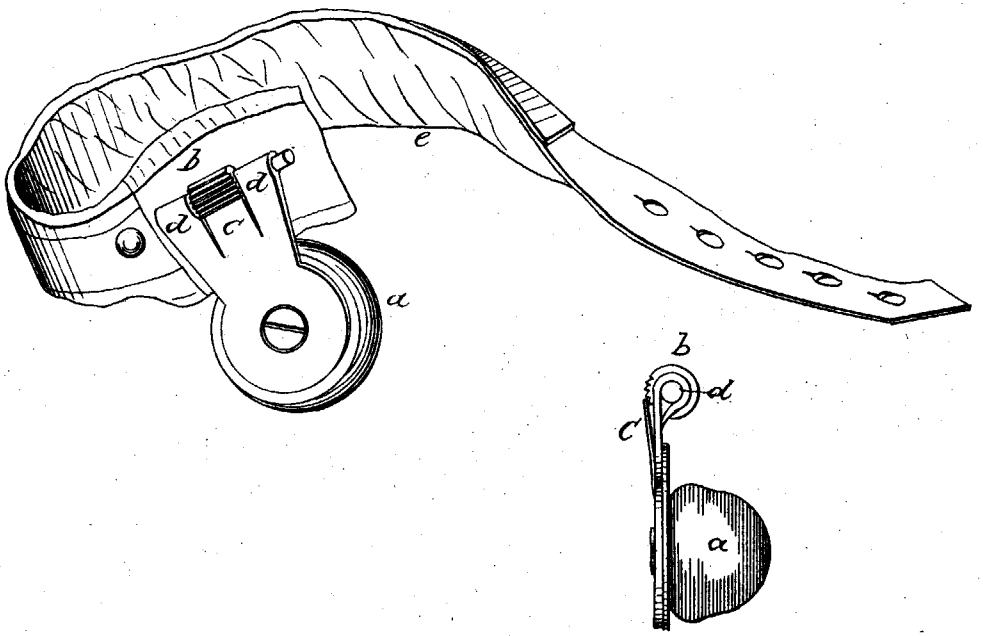
AM. PHOTO-LITHO. CO. N.Y. (OSBORNE'S PROCESS.)

Isaac Thompson.
Letters Patent

The schedule referred to in these Letters Patent and making part of,
the same containing a description in the words of the said Isaac
Thompson himself of his Improvement in the Truss for the relief
and cure of Hernia

---

To all persons to whom these presents shall come. Isaac Thomp-
son of Brattleboro in the County of Windham and State of Vermont
sends greeting. Be it known that I Isaac Thompson have
invented constructed made and applied to use a new and use-
ful improvement in the construction of trusses called Thompson's
Patent Truss specified in the words following, viz.
My Truss differs from those in common use in two particulars.
First the ball or pad instead of covering the rupture aperture like
a lid is so shaped as partially to enter it. I effect this object in most
instances by making it of a shape partaking in part of the nature
of a cone and in part of a hemisphere, perhaps half way between
them; Still as each individual patient requires a careful adap-
tation of the pad to his particular case I vary their shape a lit-
tle, sometimes a better fit is procured by making the pad or ball
like the upper or stem end of a pear, that is a cone rounded at the
apex and made flaring or trumpet shaped at the base.
In some instances I make them hemispherical but always endeav-
our to adapt their shape to the orifice or aperture, have them par-
tially enter it and have them so fitted to it that the patient wears
them with comfort. I usually turn these balls or cones of wood
and cover them with deer skin or shammy leather. but here
again I find that some have so much tenderness and irritability
of the part that sponge, deerskin or some other substance softer
than wood is preferable. The other peculiarity of my truss con-
sists in its apparatus for adjusting it to the aperture and keeping it it there, Suppose a common steel truss hoop to terminate for
two inches at the end to be worn in front in a round wire about
as large as a small goose quill. On this wire, like a watchmans rat-
tle, turns a piece of brass to which the cone or pad is firmly attach
ed at its base by a screw so that the patient can give the pad any
degree of pressure into the aperture consistent with his comfort,
and once adjusted to suit him it will stay there till he chooses
to alter it. I construct this apparatus in the following manner,
I make a brass hollow cylinder about half an inch in length and
externally of about twice the diameter of the above mentioned wire
Its inner or hollow diameter is fitted to receive the wire. On its
external cylindrical surface notches, teeth, or cogs are filed
slanting one way but the other side of each cog perpendicular or in
the direction of the radii of the cylinder so that a tongue or spring
of brass will slide easily over these teeth one way but will stand
stiff like a brace if you attempt to move it in the opposite direction.
This brass cylinder is slid on to the steel wire till it occupies a-
bout the middle of the two inches and there firmly soldered to the
wire. I next take a piece of sheet brass of about that thickness call-
ed in merchandize No 19 light. It is about one twentieth of an
inch in thickness. It should be from four to five inches in length
(if the truss be intended for an adult) and in width about one inch
and a quarter except at one end which should widen into a cir-
cle corresponding in size with the base of the cone to which it is to be
applied. I next saw longitudinally in the other or square end of
this piece of brass two slits about an inch and an half long hav-
ing between them in the middle a tongue about half an inch wide
I next cut off this tongue to about four tenths of an inch in length
and file its end to a bevel to fit the teeth or cogs in the above men
tioned cylinder. I now apply the tongue to one of the notches in
the cylinder, bend the two legs of brass around the wire to form a
hinge and rivet them in that position so that the tongue of brass
forms a spring and brace and like that of a watchmans rattle al-
lows

98487 lows a free motion in one direction but not in the other. When
double trusses are made on the above mentioned principle as also
single ones for extremely lean or emaciated patients it is well to
have the hoop with its strap pass round the body above the hip bones
then bend down three or about three inches and then in the shape of
wire bend across the belly assuming a curve fitted to the convexity of the
abdomen and on this wire have the hinge or hinges arranged.
What I claim as my invention is the combination of the above de-
scribed hinge with the ball or pad so constructed as partially to en-
ter the aperture of the hernia. In testimony that the above is a true
specification of my said improvement as above described I have
hereunto set my hand this first day of June in the year of our Lord
eighteen hundred and thirty six Isaac Thompson [illegible]

Witnesses
J. D. Bradley
Asa Keyes

1064 [illegible]) (Patented July 1. 1836)

Drawing